(12) United States Patent
McNamara et al.

(10) Patent No.: US 10,510,109 B1
(45) Date of Patent: Dec. 17, 2019

(54) CONTROLLING ROUTING OF OUTPUT INFORMATION TO OUTPUT DEVICES

(71) Applicant: Amazon Technologies, Inc., Reno, NV (US)

(72) Inventors: Alexander Michael McNamara, Seattle, WA (US); Nathan Lee Wesling, Seattle, WA (US); Natalie Thuy-Tien Nguyen, Bellevue, WA (US); Jack Bradley Jones, Seattle, WA (US); Felix Joseph Etienne Pageau, Seattle, WA (US); Lu Ye, Seattle, WA (US); Kevin Alexander Lee, Seattle, WA (US); Sridhar Boyapati, Sammamish, WA (US); Benjamin Ralph Hollis, Seattle, WA (US); David William Bettis, Seattle, WA (US); Kirk Arlo Petersen, Seattle, WA (US); Korwin Jon Smith, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1128 days.

(21) Appl. No.: 14/101,295

(22) Filed: Dec. 9, 2013

(51) Int. Cl.
*G06Q 10/10* (2012.01)
*G06Q 30/06* (2012.01)
*G06Q 30/00* (2012.01)

(52) U.S. Cl.
CPC ......... *G06Q 30/0639* (2013.01); *G06Q 30/00* (2013.01)

(58) Field of Classification Search
CPC .................................. G06F 7/00; H04M 3/42
USPC ........................ 700/216; 379/201.02; 705/28
See application file for complete search history.

(56) References Cited

U.S. PATENT DOCUMENTS

| | | | |
|---|---|---|---|
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |
| 9,473,747 | B2 | 10/2016 | Kobres et al. |
| 2003/0002712 | A1 | 1/2003 | Steenburgh et al. |
| 2004/0181467 | A1 | 9/2004 | Raiyani et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Rokib Masud
(74) *Attorney, Agent, or Firm* — Athorus, PLLC

(57) ABSTRACT

Described is a system and method for routing output information to one or more of a plurality of output devices. In one implementation, output information that includes information to be presented and a location information identifying where the output information is to be presented may be generated by an output host. The output information is received by an output router that determines, based on the location information, an output device and routes the output information to the output device for presentation.

11 Claims, 10 Drawing Sheets

(56) References Cited

U.S. PATENT DOCUMENTS

| | | | |
|---|---|---|---|
| 2007/0116325 A1* | 5/2007 | Rhoads | G01C 11/00 |
| | | | 382/100 |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2009/0048890 A1* | 2/2009 | Burgh | G06Q 10/04 |
| | | | 705/7.15 |
| 2009/0121017 A1 | 5/2009 | Cato et al. | |
| 2009/0245573 A1 | 10/2009 | Saptharishi et al. | |
| 2009/0279681 A1* | 11/2009 | McKee | H04M 3/42357 |
| | | | 379/201.02 |
| 2011/0011936 A1 | 1/2011 | Morandi et al. | |
| 2011/0295411 A1* | 12/2011 | Rotella | G06Q 10/08 |
| | | | 700/216 |
| 2012/0129553 A1* | 5/2012 | Phillips | G08B 21/0236 |
| | | | 455/456.3 |
| 2012/0284132 A1 | 11/2012 | Kim et al. | |
| 2013/0076898 A1 | 3/2013 | Philippe et al. | |
| 2013/0253700 A1 | 9/2013 | Carson et al. | |
| 2014/0156472 A1* | 6/2014 | Stuntebeck | G06Q 10/087 |
| | | | 705/28 |
| 2014/0279294 A1 | 9/2014 | Field-Darragh et al. | |
| 2015/0019391 A1 | 1/2015 | Kumar et al. | |
| 2015/0073907 A1 | 3/2015 | Purves et al. | |

OTHER PUBLICATIONS

Cristian Pop, "Introduction to the BodyCom Technology", Microchip AN1391, May 2, 2011, pp. 1-26, vol. AN1391, No. DS01391A, Publisher 2011 Microchip Technology Inc.

* cited by examiner

CONTROLLING ROUTING OF OUTPUT INFORMATION TO OUTPUT DEVICES

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment centers that can be used to replenish inventory located in the shopping areas and/or to satisfy orders for items that are placed through other channels (e.g., e-commerce). Other examples of entities that maintain inventory include libraries, museums, rental centers, and the like. In each instance, the user (e.g., picker, user, customer) must first locate the item and retrieve the item for use and/or purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
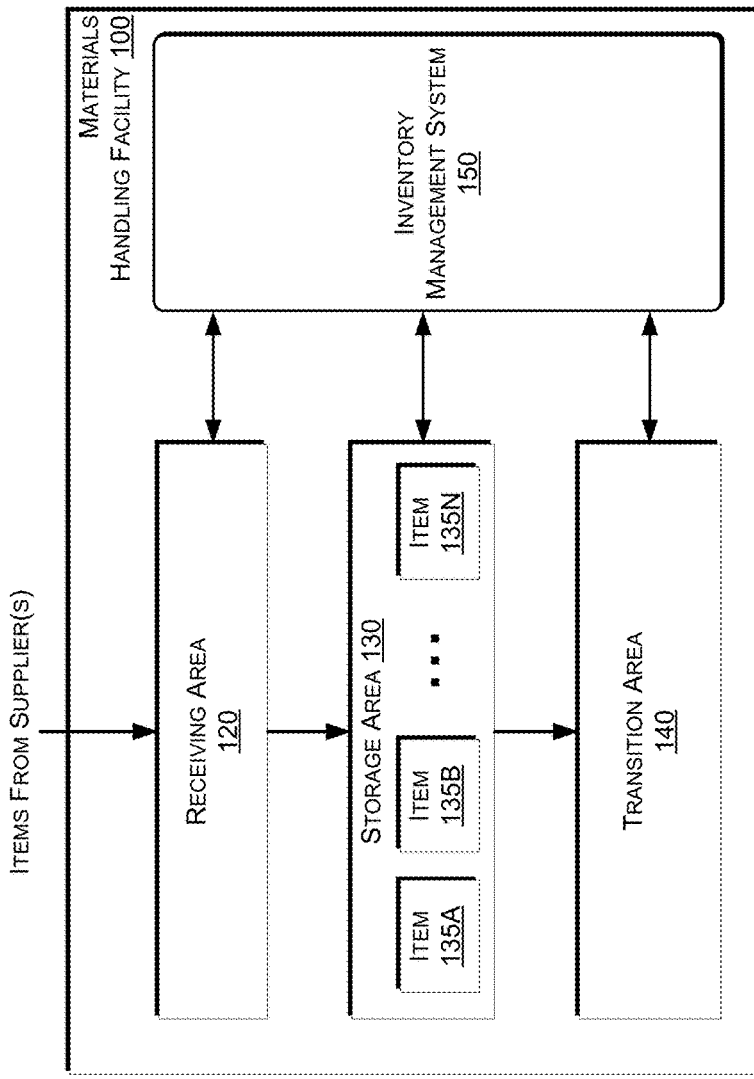
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes a system and method for routing output information to one or more of a plurality of output devices. In one implementation, output information may be generated by an output host, such as a general purpose computer that is to be presented on an output device, such as a display. Rather than having the output host connected directly to the display, or included in the display, the output host may identify a physical location (e.g., geographic coordinates), a logical location (e.g., row and column number) and/or the output device identifier that is to present the output information (collectively referred to herein as "location information") and provide the output information and location information to an output router. The output router may receive the output information and location information and route the output information to the appropriate output device(s). For example, the output router may be responsible for routing output information to hundreds of output devices and may maintain an output location map that maps each output device to a physical location. Upon receiving the output information that includes the location information, the output router may query the output location map to identify the routing to deliver the output information to the intended output device at the appropriate output location.

In some implementations, the output devices may be low cost, low power output devices that are only capable of receiving output information and presenting the output information. In other implementations, the output devices may have some limited processing capabilities and/or input capabilities (e.g., a touch based display). When an output device receives output information, it presents the output information.

By separating the output host and the output device, an output host can provide output information for many output devices. Likewise, if an output host becomes unavailable and/or is experiencing too much load, the output device(s) can be quickly mapped to a different output host without any disruption or physical changes necessary. Likewise, if an output device needs to be replaced, the replacement is lower cost and not disruptive to the system. For example, the output device may be a simple display that is connected to the system through a wired or wireless connection, such as a universal serial bus ("USB") wired connection. In some implementations the connection with the output device may be used to provide power and output information to the output device. Likewise, in some implementations, the connection with the output device may be used to provide input received at the output device to the inventory management system (discussed below).

Utilizing a simple connection point between the output device and the system reduces the cost and/or labor involved in replacing output devices. As described herein, an output device may simply be disconnected and replaced with another output device. When connected and powered, the output device is identified by the output router and the output location map is updated to associate the newly identified output device with the physical location of the output device. Likewise, because the output device is not connected to a network the risk of a security breach into the system is reduced.

As discussed in more detail below, some materials handling facilities may include numerous (e.g., hundreds or thousands) of displays or other output devices and likewise may have numerous users located within the materials handling facility at any time. The systems described herein can monitor the location of each user within the materials handling facility and an output host can provide output information, specific to each user, to output routers and those output routers can route the user specific information to the appropriate output devices for presentation to the users.

While the examples discussed herein often refer to displays as output devices, in other implementations, the output information may be presented on different forms of output devices. For example, rather than a display, the output device may be a projector, speaker, haptic output, etc. In each instance, the output device may be connected to one or more output routers and receive output information from those output routers. Likewise, some output devices may be capable of receiving input and providing received input to the host controllers and/or other components.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store the items until a customer orders or retrieves one or more of the items. The general flow of items through materials handling facility 100 is indicated using arrows. Specifically, as illustrated in this example, items 135 may be received from one or more suppliers, such as manufacturers, distributors, wholesalers, etc. at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, or as a user progresses through the materials handling facility 100, the corresponding items 135 may be selected or "picked" from storage area 130. For example, in one implementation, a user may have a list of items to pick and may progress through the materials handling facility picking items 135 from the storage area 130. In other implementations, materials handling facility employees may pick items 135 using written or electronic pick lists derived from customer orders.

Figure 2:
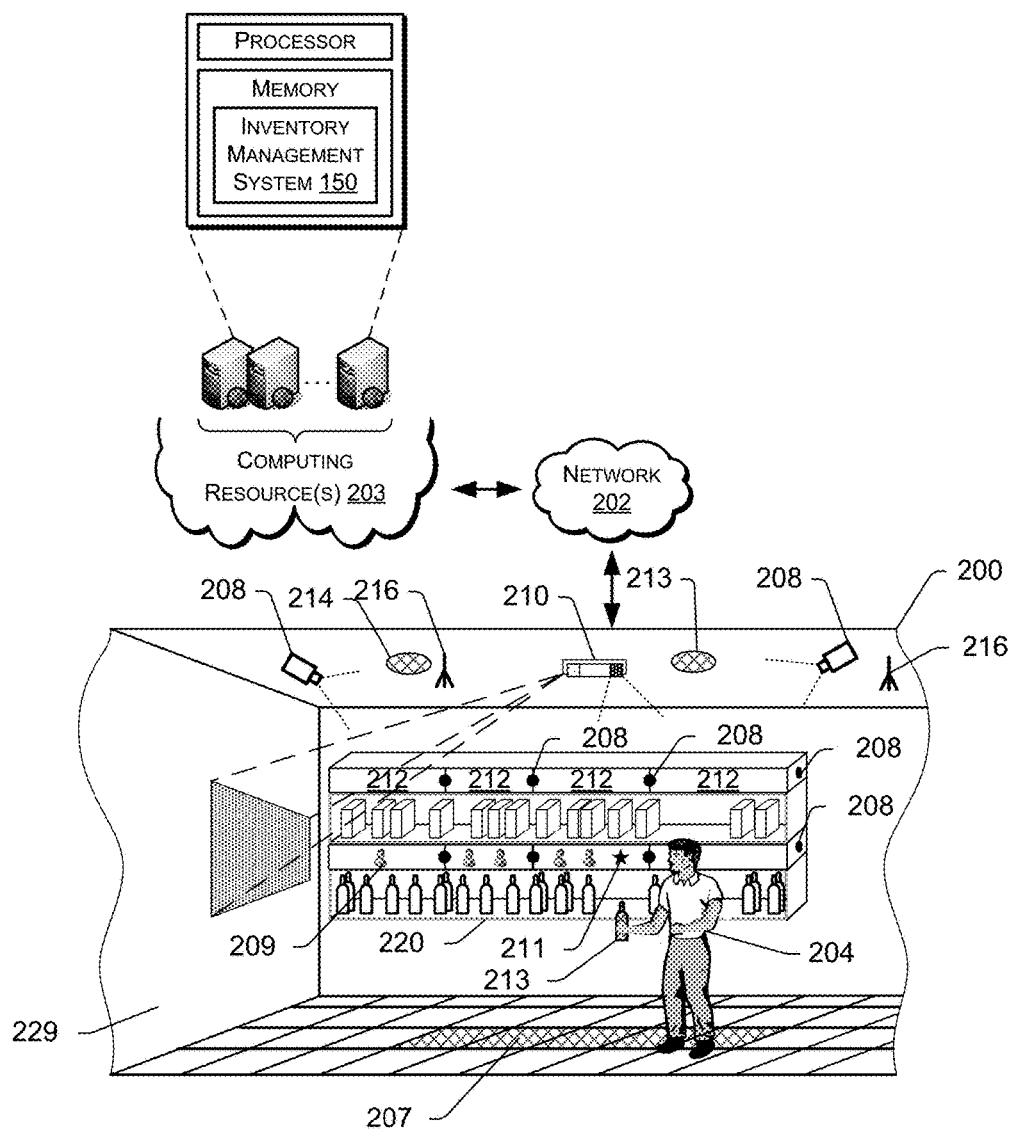
FIG. 2 is a block diagram illustrating additional details of a materials handling facility, according to some implementations.

FIG. 2 shows additional components of a materials handling facility 200, according to some implementations. Generally, the materials handling facility 200 may include one or more image capture devices, such as cameras 208. For example, one or more cameras 208 may be positioned in locations of the materials handling facility 200 so that images of locations and/or users within the materials handling facility can be captured. In some implementations, the image capture devices 208 may be positioned overhead, such as on the ceiling to capture images of users, output devices, and/or locations within the materials handling facility. In addition, in some implementations, one or more cameras 208 may be positioned on or inside of inventory locations. For example, a series of cameras 208 may be positioned on external portions of the inventory locations and positioned to capture images of users and/or the location surrounding the inventory location. Likewise, one or more cameras 208 may be positioned within the inventory locations to capture images of items stored in the inventory locations.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to camera's, other input devices, such as pressure sensors, infrared sensors, a scale, a light curtain, etc. may be utilized with the implementations described herein. For example, a pressure sensor and/or a scale may be used to detect when an item is added and/or removed from inventory locations.

When the user 204 arrives at the materials handling facility 200, one or more images of the user 204 may be captured and processed. For example, the images of the user 204 may be processed to identify the user 204. This may be done using a variety of techniques such as facial recognition, pattern matching, etc. In some implementations, rather than, or in addition to, processing images to identify the user, other techniques may be utilized to identify the user. For example, the user may provide an identification (e.g., user name, password), the user may present an identifier (e.g., identification badge, card), an active tag (e.g., RFID tag) in the possession of the user may be detected, a visual tag in the possession of the user may be detected, biometrics may be utilized to identify the user, etc.

In some implementations, a user 204 located in the materials handling facility 200 may possess a portable device 205 and obtain information about items located within the materials handling facility 200. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150 and be used to identify the user 204. In some instances, the portable device 205 may also have other features, such as audio input/output (e.g., speaker(s), microphone(s)), video input/output (camera(s), projector(s)), haptics (e.g., keyboard, keypad, touch screen, joystick, control buttons) and/or other components.

In some instances the portable device 205 may operate in conjunction with or may otherwise utilize or communicate with one or more components of the inventory management system 150. Likewise, components of the inventory management system 150 may interact and communicate with the portable device 205 as well as identify the user 204, communicate with the user 204 via other means and/or communicate with other components of the inventory management system 150.

Generally, the inventory management system 150 may include one or more input/output devices, such as imaging devices (e.g., cameras) 208, projectors 210, displays 212, speakers 213, microphones 214, etc. to facilitate communication between the inventory management system 150 and/or the user 204. In some implementations, multiple input/output devices may be distributed within the materials handling facility 200. For example, there may be multiple imaging devices, such as cameras, located on the ceilings and/or cameras (such as pico-cameras) located in the aisles near the inventory items.

Likewise, the inventory management system 150 may also include one or more communication devices, such as wireless antennas 216 that facilitate wireless communication (e.g., Wi-Fi, Near Field Communication (NFC), Bluetooth) between the inventory management system 150 and the portable device 205. The inventory management system 150 may also include one or more computing resource(s), such as server system 203 that may be local to the environment (e.g., materials handling facility), remote from the environment, or any combination thereof.

The inventory management system 150 may utilize antennas 216 within the materials handling facility 200 to create a network 202 (e.g., Wi-Fi) so that the portable device 205 can connect to and communicate with the inventory management system 150 and/or so the inventory management system can connect to and communicate with the output routers (discussed below). Likewise, in instances when one or more of the components of the inventory management system 150 are remote from the materials handling facility 200, they may communicate with other components of the inventory management system 150 and/or the portable device 205 via the network 202.

Returning to FIG. 2, the output information may include information that is unique to the user to assist the user in identifying the user path associated with the user. For example, the visual identifier 209 may be unique to the user. The visual identifier may be selected and/or provided by the user, or assigned to the user by the inventory management system 150. If there are multiple users in the same area of the materials handling facility, the appropriate user identifier may be detected by each user so that the user can identify appropriate user path.

As the user moves around the materials handling facility, the inventory management system 150 may assist the user in identifying items and/or discovering information about items by processing images collected by input/output components 208-216 positioned around the materials handling facility and providing output information to output devices near the user that present the output information to the user. For example, when the user reaches a location in the materials handling facility 200 that includes an item that is to be picked by the user, output information that includes a visual identifier identifying the location of the item to be picked may be routed to an output device near the location of the user and/or the item. Likewise, additional information may be included and presented as part of the output information. For example, information about the item to be picked may be included in the output information that is routed to the output device and presented to the user.

In addition to, or as an alternative to visual and/or audio location determination and tracking of the user, the inventory management system 150 may also utilize other techniques, such as triangulation between antennas 216, to determine the location of the user 204 as the user moves through the materials handling facility 200. In other examples, the portable device 205 may include a global positioning system (GPS) receiver that obtains GPS information as to the location of the portable device 205. In other implementations the portable deice 205 may be detectable and/or communicate with an indoor positioning system. In such an implementation, the portable device 205 may provide the received GPS information to the inventory management system 150. In other implementations the portable deice 205 may be detectable and/or communicate with an indoor positioning system.

Figure 3:
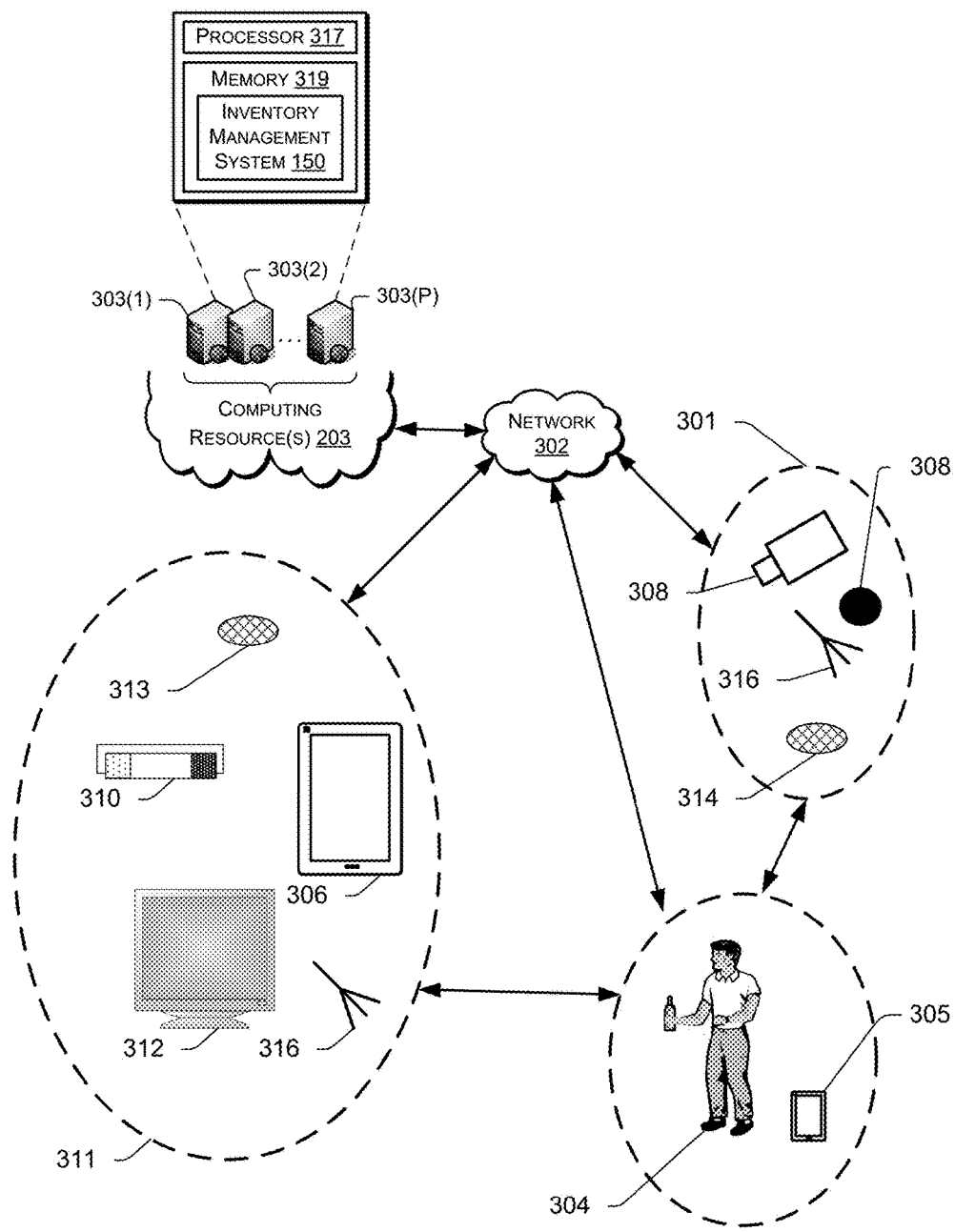
FIG. 3 shows additional components and communication paths between component types utilized in a materials handling facility of FIG. 1, according to some implementations.

FIG. 3 shows additional components and communication paths between component types utilized in an inventory management system 150 of FIG. 1, in accordance with some implementations. As discussed above, the portable device 305 may communicate and interact with various components of an inventory management system 150 over a variety of communication paths. Generally, the inventory management system 150 may include input components 301, output components 311 and computing resource(s) 203. The input components 301 may include an imaging device 308, microphone 314, antenna 316, or any other component that is capable of receiving input about the surrounding environment and/or from the user. The output components 311 may include a projector 310, a portable device 306, a display 312, an antenna 316, a radio (not shown), speakers 313 and/or any other component that is capable of providing output to the surrounding environment and/or the user. In some implementations, the display 312 may be a liquid crystal display, an LED display, an electrophoretic (e-ink) display, an electrowetting display, a plasma display, or the like.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 302 with input components 301, output components 311 and/or directly with the portable device 305 and/or the user 304.

As illustrated, the computing resource(s) 203 may be remote from the environment and implemented as one or more servers 303(1), 303(2), . . . , 303(P) and may, in some instances form a portion of a network-accessible computing platform implemented as a computing infrastructure of processors, storage, software, data access, and so forth that is maintained and accessible by components/devices of the inventory management system 150 and/or the portable device 305 via a network 302 such as the Internet. For example, the computing resources 203 may process images of users 304 to identify the user 304 and/or to identify gestures presented by the user 304. The computing resource(s) 203 do not require end-user knowledge of the physical location and configuration of the system that delivers the services. Common expressions associated for these remote computing resource(s) 203 include "on-demand computing," "software as a service (SaaS)," "platform computing," "network-accessible platform," "cloud services," "data centers," and so forth.

Each of the servers 303(1)-(P) include a processor 317 and memory 319, which may store or otherwise have access to an inventory management system 150, which may include or provide image processing (e.g., for user identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
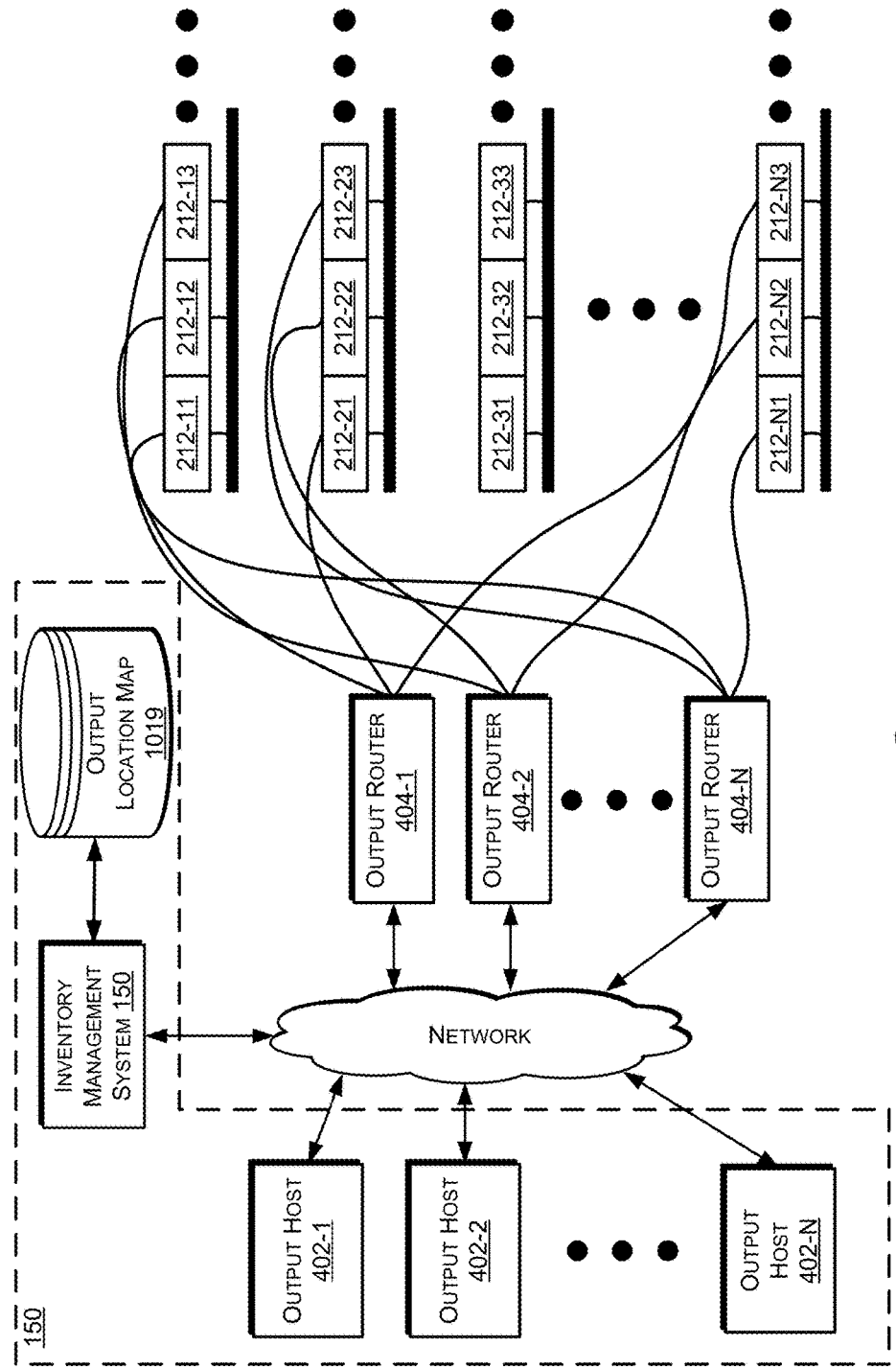
FIGS. 4 and 5 are block diagrams of example output information routing architectures for routing output information to output devices within a materials handling facility, according to some implementations.

FIG. 4 is a block diagram of an example output routing architecture 400 for routing output information to output devices, according to an implementation. As illustrated, the inventory management system 150 may include one or more output hosts 402-1, 402-2, 402-N that generate output information for presentation on output devices 212-11, 212-12, 212-13, 212-21, 212-22, 212-23, 212-31, 212-32, 212-33, 212-N1, 212-N2, 212-N3. While the example in FIG. 4 illustrates three output hosts, in other implementations, the inventory management system may include additional or fewer output hosts. Likewise, in some implementations there may be additional or fewer displays 212 than that illustrated and discussed with respect to FIG. 4.

The output hosts 402 may be configured to generate multiple different instances of output information that is presented on different output devices 212. As illustrated, the output hosts 402 may be configured to generate output information for one or many output devices 212. The output information may be the same and/or different for each output device 212. For example, an output host 402 may be configured to provide output information to all output devices positioned in an aisle of the materials handling facility. In other implementations, the output host 402 may be configured to provide output information for all output devices within the materials handling facility. In still further implementations, the output host 402 may be configured to provide output information for presentation on a plurality of output devices 212 positioned at different locations within the materials handling facility. In such an implementation, the output devices 212 for which a single output host 402 provides output information may be physically dispersed around the materials handling facility. For example, output host 402-1 may provide output information for presentation on output devices 212-12, 212-21, 212-N3, etc. Output host 402-2 may be configured provide output information for presentation on output devices 212-13, 212-22, 212-N2, etc. Output host 402-N may be configured to provide output information for presentation on output devices 212-11, 212-23, 212-N1.

Physically distributing the location of the output devices for which a single output host 402 generates output information provides load balancing of capacity for the output host 402, because output information may not be presented to output devices at the same rate. Likewise, if the output host 402 becomes unavailable, it will not affect all output devices 212 in the same area of the materials handling facility. Still further, the output host 402 that is configured to provide output information for presentation on a particular output device 212 may be modified by altering the output location mapping that is used by the output routers 404 to route the provided output information to the appropriate output device.

In addition to the output hosts 402, the example architecture includes one or more output routers 404 that are configured to communicate with the output hosts 402, output devices 212 and route output information provided by the output hosts 402 to the appropriate output devices 212. The output routers 404 may be configured to manage the routing of output information by accessing an output location map stored in the output location data store 1019 that is managed by the inventory management system 150. In other implementations, the output location map may be managed by the output routers 404.

Figure 5:
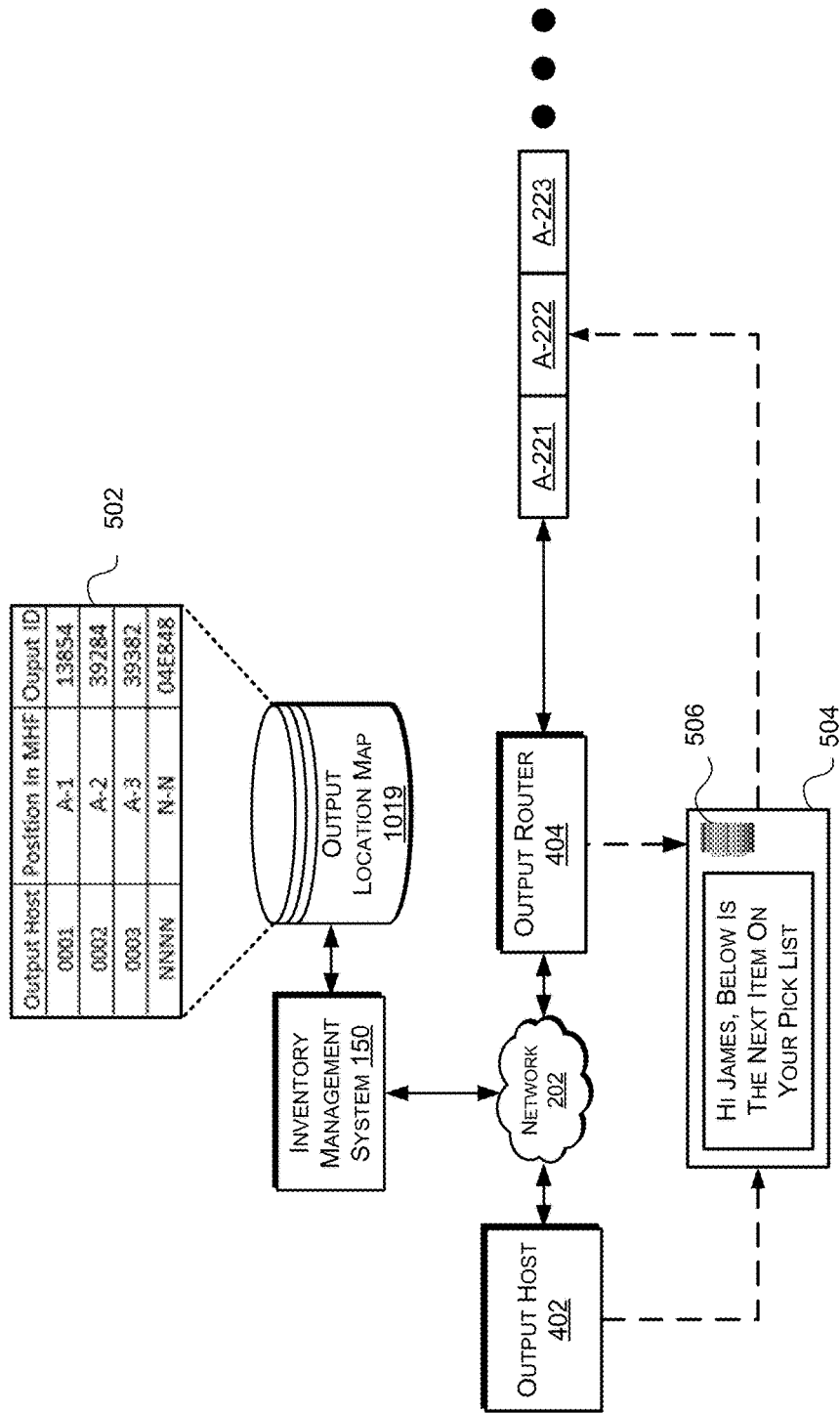

Turning briefly to FIG. 5, the output location map data store 1019 includes an output location map that is used by the output routers 404 to route output information to the appropriate output device. As illustrated, the output map 502 may be a data table, or other form, that identifies a relationship between an output host and a physical output location within the materials handling. For example a physical mapping of the materials handling facility may be established and the physical location of where output devices are located, or to be located, identified (referred to herein as an output location). For example, the geographic coordinates of each output location may be determined and stored in the output location map. Alternatively, the output locations may be identified based on their positioning within the materials handling facility. For example, the output locations may be identified by an aisle, shelf, row and/or position identifier.

For each output location, the output location map may include an association with an output host that is configured to provide output information that is to be presented at that output location. In addition, an output identifier may also be maintained in the output location map 502 and associated with an output location. In some implementations, the output identifier may identify an output device that has been positioned and powered at the output location. In another implementation, each output location may have a wired connection to an output router. In such an instance, the output identifier may identify the output port of the output router into which the wired connection terminates. In either case, the output location may be used by the output router 404 to route output information for presentation at the appropriate output location.

Returning to FIG. 4, the output routers 404 may be configured to control routing of output information provided by an output host 402 to one or many output devices 212. For example, an output router 404 may be configured to control routing of output information to all output devices positioned in an aisle of the materials handling facility. In other implementations, the output router 404 may be configured to manage the routing of all displays within the materials handling facility. In still further implementations, the output router 404 may be configured to manage the routing of a plurality of output displays positioned at different locations within the materials handling facility. In such an implementation, the output devices 212 managed by an output router 404 may be physically dispersed around the materials handling facility. For example, output device 404-1 may manage the routing of output information to output devices 212-12, 212-21, 212-N3, etc. Output device 404-2 may be configured to manage the routing of output information to output devices 212-13, 212-22, 212-N2, etc. Output device 404-N may be configured to manage the routing of output information to output devices 212-11, 212-23, 212-N1.

Physically distributing the location of the output devices that are managed by the same output router 404 provide load balancing of capacity for the output router 404, because output information may not be presented to output devices at the same rate. Likewise, if the output router 404 becomes unavailable, it will not affect all output devices 212 in the same area of the materials handling facility. In some implementations, more than one output router 404 may be configured to manage routing of information to an output device. In such an example, a primary output router may be designated, such as output router 404-1 and a secondary output router, such as output 404-2 available in the event the primary output router becomes unavailable.

While the example illustrated in FIG. 4 shows the output hosts as part of the inventory management system 150 and the output routers 404 as separate from the inventory management system 150, in other implementations, the inventory management system 150, output hosts 402 and/or output routers 404 may be configured differently. For example, the output hosts 402 may be considered separate from the inventory management system, the output routers may be considered part of the inventory management system 150 and/or any combination thereof.

FIG. 5 provides additional information regarding the routing of output information to the appropriate output device, according to the various implementations discussed herein. As shown, the output device 212 and output hosts are independent of one another. The output router 404 receives output information 504 from the output host, determines the appropriate output device 212 and transmits the information to the determined output device. With this implementation, the output devices 212 can be low cost and easily replaceable. For example, the output devices may be simple display monitors with a wired connection for receiving the output information from the output router 404. In one implementation, the output devices may be configured to receive the output information via a USB cable. Likewise, power may be provided to the output devices via the same USB cable or through an electrical outlet positioned near the output device.

The following is an example use case for routing output information 504 generated by an output host 402 to an output device 212, according to an implementation. When a user enters the materials handling facility, the inventory management system 150 may identify the user 204 (e.g., facial recognition, user ID card, user provided information, biometrics). Upon identifying the user 204, a user profile may be retrieved from a user data store. The user profile may include, among other information, item pick history, item view history, purchase history, pick list, associations with other users, etc.

The location of the user within the materials handling facility may also be determined. In some implementations, the orientation, direction and/or speed of the user's movement through the materials handling facility may also be determined. Based on the location of the user, output information is generated by the inventory management system 150 and provided by the host controller 402 configured to provide the output information to an output device near the location of the user. The output information may be any information that is to be presented to the user. For example, the output information may include a pick list, a user identifier (e.g., avatar), a recommended item, information about a nearby item, etc.

Also included in the output information is location information. The location information identifies the location within the materials handling facility where the output information is to be presented. For example, if the locations within the materials handling facility where output devices are located are represented by geographic coordinates, the geographic coordinates may be included in the output information. Alternatively, if the locations within the materials handling facility where output devices are located are represented by position information (e.g., aisle, shelf, row number), the position information may be included in the output information. The output information may be included as a barcode, watermark, color depth, or other form of identifier. For example, the output information 504 includes a barcode 506 that identifies the location within the materials handling facility identified by location information A-222.

In some implementations, as illustrated in FIG. 5, the location information may be included in a portion of the output information that is not visible when presented on an output device. For example, if the output information to be presented is a video or image, the location information may be included in the video or image but outside the frame that is visible when presented by output device 212. In some implementations, the location information may also identify a portion of an output device onto which the output information is to be presented. In such an example, multiple sets of output information may be provided to the same output device and the location information may identify a portion of the output device that is to be used to present the output information. With this configuration, multiple sets of output information (e.g., different videos) can be simultaneously presented by the same output device. The multiple sets of output information may be combined when presented be the output device and/or may be rendered into a single combined presentation before it is presented by the output device.

The output host 402 provides the output information via the network 202 to the output router 404. In some implementations, the output information may be part of a frame buffer, the contents of which are provided by the output host to the output router. The data of the frame buffer may include output information for one or many output locations. The output router 404 processes the data to obtain the location information. Utilizing the location information the output router looks up the identification of the output device associated with the output location, as stored in the output location map 502. Utilizing the output device identifier, the output router 404 transmits the output information for presentation at the appropriate output location within the materials handling facility.

In some implementations, the output device may be configured to receive input. For example, the output device may be a touch-based display that is capable of receiving input from a user. In such an implementation, when input is received at an output device, the output device provides the input information and an output device identifier back to the output router. In a similar manner, the output router, upon receiving the output device identifier and input information may query the output location map stored in the output location map data store to identify an associated output host. Upon identifying the output host, the received input information is provided to the output host for processing by the inventory management system 150.

Figure 6:
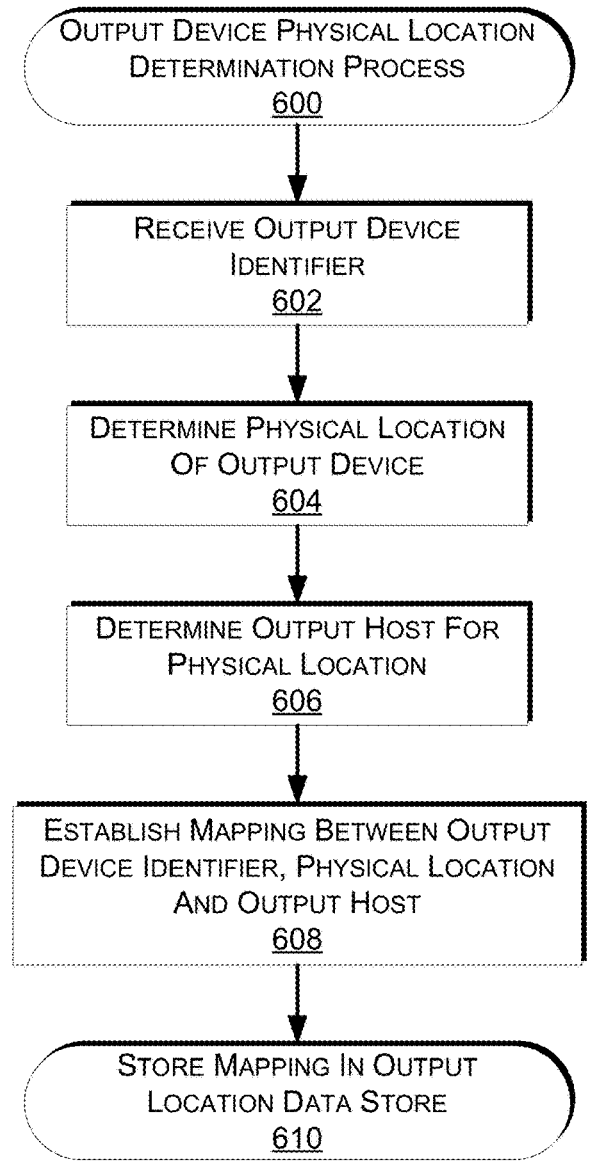
FIG. 6 is a flow diagram of an example process for determining a physical location of an output device, according to some implementations.

FIG. 6 depicts a flow diagram of an example process 600 for determining the physical location of an output device, according to some implementations. The process of FIG. 6 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 600 begins by receiving an output device identifier, as in 602. For example, when an output device is initially connected to the inventory management system and powered on, the output device transmits identification information to the inventory management system and/or the output router. For example, if a wired connection (e.g., USB, HDMI) is provided to the output device, when the output device is powered on it will transmit an output device identification over the wired connection. Likewise, if the output device includes a wireless connection (e.g., Wi-Fi), when the output device is power on, it will wirelessly transmit output device identification information.

Upon receiving an output device identifier, the physical location of the output device is determined, as in 604. For example, if the output device is communicating over a wired connection, the wired connection may be associated with a physical location within the materials handling facility. Upon receiving the output device identifier over the wired connection, the location of the output device is known because the wired connection is already associated with a physical location within the materials handling facility. In other implementations, an output device identifier may be physically presented on the output device and one or more image capture devices located within the materials handling facility may capture an image of the output device and the corresponding output device identifier. For example, a barcode or other label may be affixed to the output device that includes the output device identifier.

Alternatively, or in addition thereto, the output device may present an image that includes the output device identifier. The captured images may be processed to detect the presence of the output device and the output device identifier. For example, object and/or character recognition may be performed on the captured images to determine the output device identifier. Upon determining the output device identifier, the position of the image capture device and/or other objects in the captured image are determined and used to determine the location of the output device. In still other implementations, a user may provide the location of the output device.

Based on the determined location of the output device, an output host is determined that is configured to provide output information to the location of the output device, as in 606. As discussed above, one or more output devices may be configured to provide output information to the location of the output device. Based on the determined information, a mapping is established between the output device identifier, the physical location and the output host and stored in the output location map, as in 608. The output location map is stored in the output location map data store, as in 610.

Figure 7:
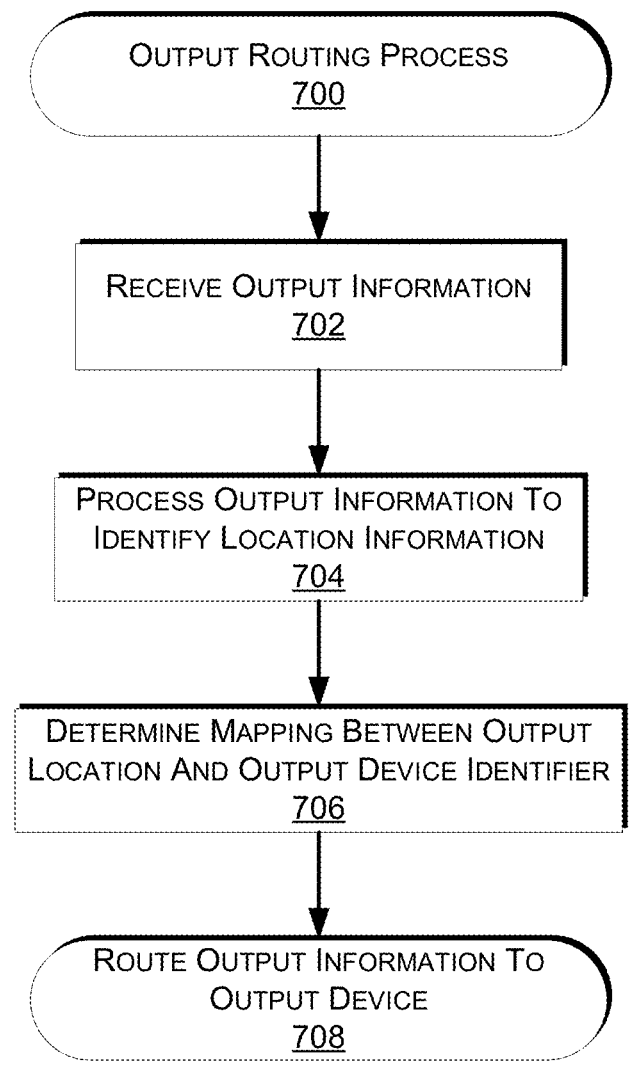
FIG. 7 is a flow diagram of an example process for routing output information to one or more output devices, according to some implementations.

FIG. 7 is a flow diagram of an example process 700 for routing output information to one or more output devices, according to some implementations. The example process 700 begins upon receipt of output information provided from an output host, as in 702. The received output information is then processed to identify the location information included in the output information, as in 704. Based on the determined location information, the output location map stored by the inventory management system is utilized to determine a mapping between the location information and an output device positioned at the location, as in 706. As discussed above, the output location map identifies an association between the output locations and output device identifiers positioned at the output locations within the materials handling facility. Based on the determined output device, the output information is transmitted to the output device for presentation, as in 708.

Figure 8:
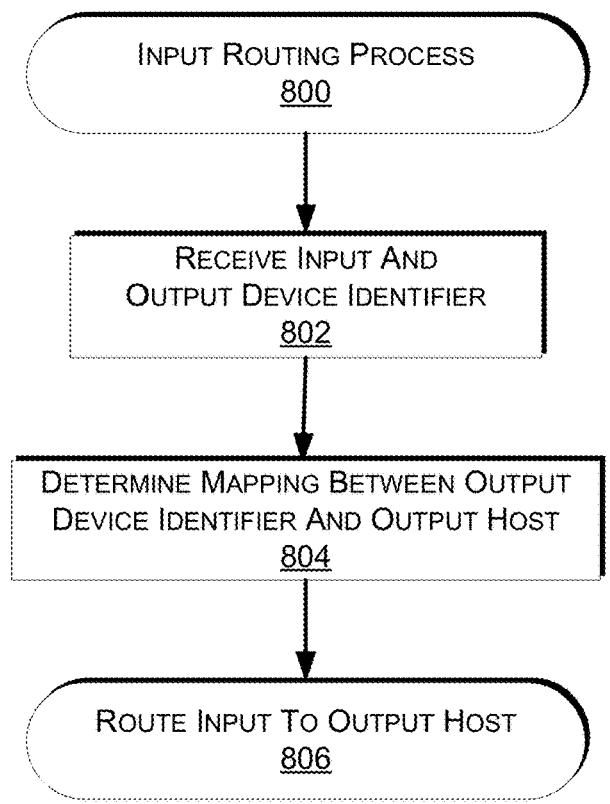
FIG. 8 is a flow diagram of an example process for routing input received at an output device, according to some implementations.

FIG. 8 is a flow diagram of an example process 800 for routing input received at an output device, according to some implementations. The example process 800 begins by receiving an input and an output device identifier, as in 802. For example, if the output device is a touch-based display and the user interacts with the touch-based display, the input provided by the user and the output device identifier associated with the output device that received the input are provided back to the output router. Upon receiving the input and the output device identifier a mapping between the output device identifier and an output host are determined, as in 804. For example, the output mapping stored in the output location map data store may be queried to determine the association between the received output device identifier and an output host. Finally, based on the determined output host, the input is routed to the output host, as in 806.

Figure 9:
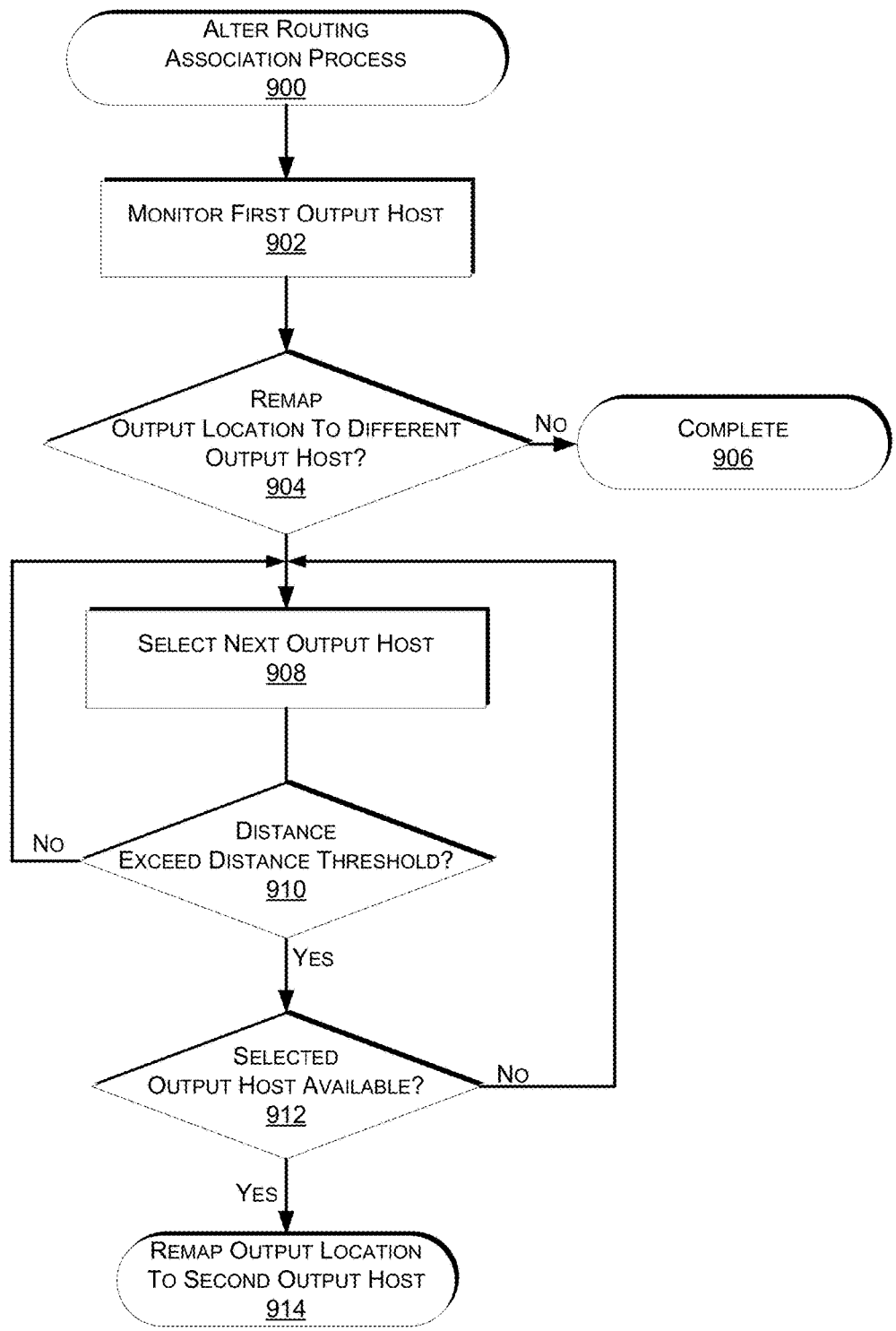
FIG. 9 is a flow diagram of an example process for remapping output locations with output hosts, according to some implementations.

FIG. 9 is a flow diagram of an example process 900 for altering a routing association between an output host and an output location, according to some implementations. The example process begins by monitoring a first output host, as in 902. For example, the inventory management system may continually or periodically monitor the health, load and/or other characteristics of the output hosts that are providing output information.

Based on the monitoring of the first output host, a determination is made as to whether one or more output locations currently associated with the output host should be remapped so that the output information for the output location is provided by a different output host, as in 904. It may be determined that an output location should be remapped to a different output host for a variety of reasons. For example, it may be determined that an output location should be remapped if the capacity of the output host exceeds a defined threshold, if the output host fails, if the output information is not provided by the output host and/or received by the output device, if the first output host is not responding, and the like. In some implementations, the output may be remapped to a virtual output device and/or a test output device to confirm whether there is a hardware problem with the output device.

If it is determined that an output location should not be remapped, the example process 900 completes, as in 906. However, if it is determined that the output location should be remapped so that a different output host is providing the output information for that output location, a next output host may be selected, as in 908. For example, a next output host may be randomly selected, selected based on current capacity of output hosts, and/or based on other factors.

For the selected next output host, a determination is made as to whether the physical distance between the output location and the other output locations currently associated with the next output host exceeds a distance threshold, as in 910. The distance threshold may be any defined distance. For example, the distance threshold may be an area around the output location, an aisle that includes the output location or any other representation of a physical measurement with respect to the output location. In some implementations, rather than determining a distance between output locations, the assignment of output locations to different output hosts may be done in a systematic manner. For example, all output locations at the first position in the rows of a materials handling facility may be assigned to a first output host (or first group of output hosts), all output locations at the second position in the rows may be assigned to a second output host (or second group of output hosts), etc. Alternatively, if the output locations are numbered, in some implementations, all oddly numbered output locations may be assigned to one or more specific output hosts and all evenly numbered output locations may be assigned to one or more other output hosts. In such examples, an algorithm, such as a hashing algorithm may be utilized to select a new output host to which an output location is to be remapped.

If it is determined that the distance does not exceed the distance threshold, the example process 900 returns to block 908 and continues by selecting another output host for consideration. However, if it is determined that the distance does exceed the distance threshold, a determination is made as to whether the selected output host is available, as in 912. For example, it may be determined that the selected output host is available if it has sufficient capacity to provide output information for presentation at the output location. Alternatively, the output host may be determined available based on the number of output devices currently associated with it, based on a determination that that the output device is responding to requests, and the like.

If it is determined that the output host is not available, the example process 900 returns to block 908 and continues by selecting the next output device. If it is determined that the output host is available, the association between the first output host and the output location maintained in the output location data store is updated to associate the selected output host with the output location, as in 914.

Figure 10:
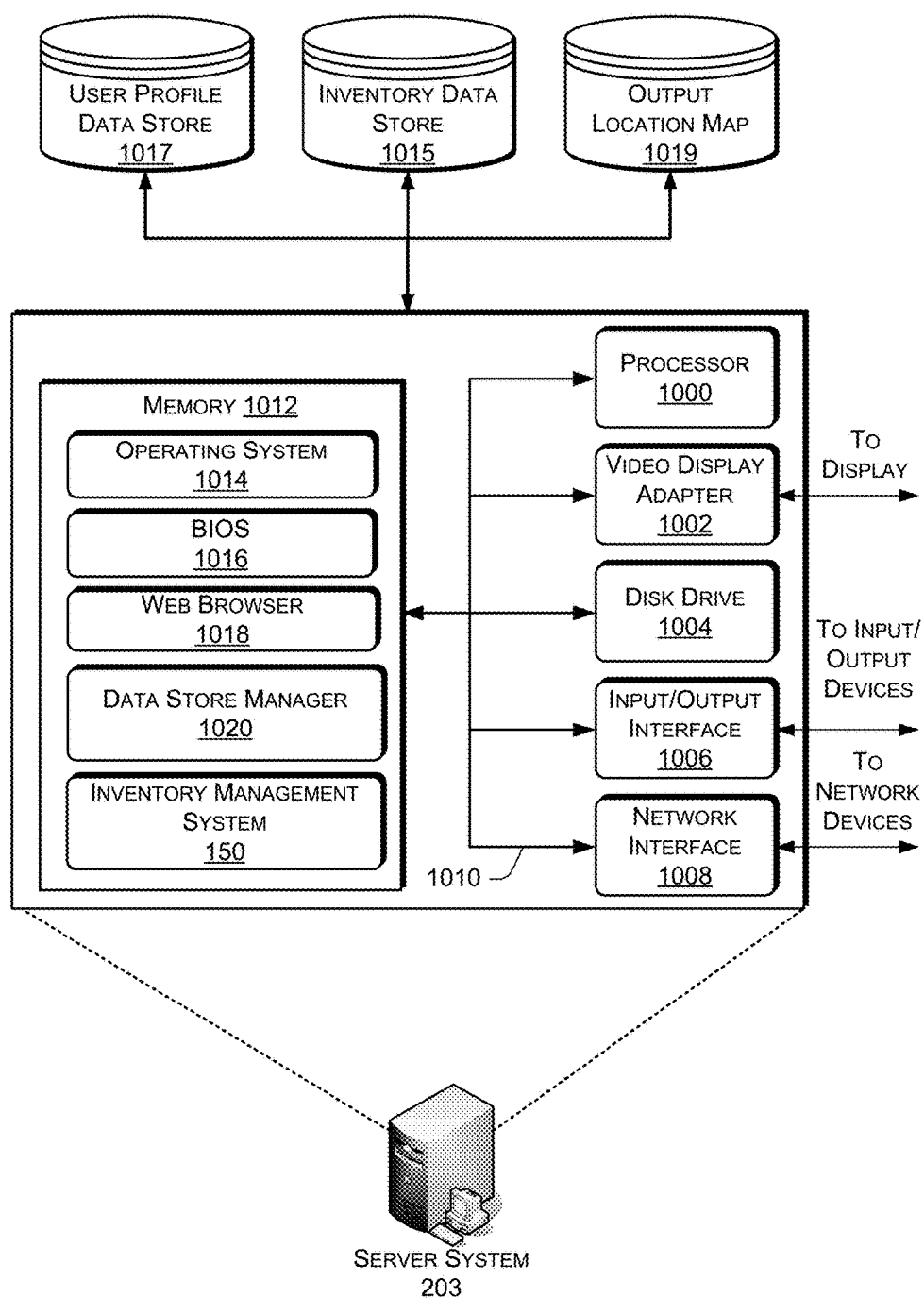
FIG. 10 is a block diagram of an illustrative implementation of a server system that may be used with various implementations.

FIG. 10 is a pictorial diagram of an illustrative implementation of a server system, such as the server system 203 that may be used in the implementations described herein. The server system 203 may include a processor 1000, such as one or more redundant processors, a video display adapter 1002, a disk drive 1004, an input/output interface 1006, a network interface 1008, and a memory 1012. The processor 1000, the video display adapter 1002, the disk drive 1004, the input/output interface 1006, the network interface 1008, and the memory 1012 may be communicatively coupled to each other by a communication bus 1010.

The video display adapter 1002 provides display signals to a local display (not shown in FIG. 10) permitting an operator of the server system 203 to monitor and configure operation of the server system 203. The input/output interface 1006 likewise communicates with external input/output devices not shown in FIG. 10, such as a mouse, keyboard, scanner, or other input and output devices that can be operated by an operator of the server system 203. The network interface 1008 includes hardware, software, or any combination thereof, to communicate with other computing devices. For example, the network interface 1008 may be configured to provide communications between the server system 203 and other computing devices via the network 202, as shown in FIG. 2 and FIG. 3.

The memory 1012 generally comprises random access memory (RAM), read-only memory (ROM), flash memory, and/or other volatile or permanent memory. The memory 1012 is shown storing an operating system 1014 for controlling the operation of the server system 203. A binary input/output system (BIOS) 1016 for controlling the low-level operation of the server system 203 is also stored in the memory 1012.

The memory 1012 additionally stores program code and data for providing network services that allow the inventory management system 150 to identify users and/or items within the materials handling facility. Accordingly, the memory 1012 may store a browser application 1018. The browser application 1018 comprises computer executable instructions, that, when executed by the processor 1000 generate or otherwise obtain configurable markup documents such as Web pages. The browser application 1018 communicates with a data store manager application 1020 to facilitate data exchange between the inventory data store 1015, the user profile data store 1017 and/or the output location information data store 1019.

As used herein, the term "data store" refers to any device or combination of devices capable of storing, accessing and retrieving data, which may include any combination and number of data servers, databases, data storage devices and data storage media, in any standard, distributed or clustered environment. The server system 203 can include any appropriate hardware and software for integrating with the data stores 1015, 1017, 1019 as needed to execute aspects of the inventory management system 150.

The data stores 1015, 1017, 1019 can include several separate data tables, databases or other data storage mechanisms and media for storing data relating to a particular aspect. For example, the data stores 1015, 1017, 1019 illustrated include mechanisms for inventory information, user profile information, output device information, output router information, output location information, output location mapping, etc., which can be used to identify users, develop user paths for users, develop output information, locate output devices, route output information to an appropriate output device, etc.

It should be understood that there can be many other aspects that may be stored in the data stores 1015, 1017, 1019. The data stores 1015, 1017, 1019 are operable, through logic associated therewith, to receive instructions from the server system 203 and obtain, update or otherwise process data in response thereto.

The memory 1012 may also include the inventory management system 150, discussed above. The inventory management system 150 may be executable by the processor 1000 to implement one or more of the functions of the server system 203. In one implementation, the inventory management system 150 may represent instructions embodied in one or more software programs stored in the memory 1012. In another implementation, the inventory management system 150 can represent hardware, software instructions, or a combination thereof.

The server system 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for presenting output information, comprising:
    a plurality of output devices located within a materials handling facility;
    an output host configured to provide output information for presentation by at least one of the plurality of output devices, wherein the output information includes an image to be presented by an output device of the plurality of output devices, the image including location information indicating at least one of:
        a physical location within the materials handling facility at which at least a portion of the output information is to be presented;
        a logical location within the materials handling facility at which at least a portion of the output information is to be presented; or
        a device identifier identifying the output device of the plurality of output devices that is to present at least a portion of the output information;
    an output router communicatively coupled with the output host and each of the plurality of output devices, wherein the output router is configured to at least:
        receive the output information from the output host;
        process at least a portion of the image included in the output information to obtain the location information;
        determine, based at least in part on the location information, the output device from the plurality of output devices to which to send the output information; and
        send the output information to the output device; and
    the output device configured to at least:
        receive the output information; and
        present at least a portion of the image.

2. The system of claim 1, wherein:
    the output router accesses an output device map to determine the output device associated with the physical location or the logical location.

3. The system of claim 1, wherein:
    the output router includes a plurality of output ports and is communicatively coupled to the output device with a wired connection coupled to one of the plurality of output ports; and
    the determination of the output device includes determining an output port that includes the wired connection with the output device.

4. The system of claim 1, wherein the output device is further configured to at least:
    present at least a portion of the image such that the output information is not visible in the presentation of the at least a portion of the image.

5. An apparatus, comprising:
    one or more processors;
    a plurality of outputs configured to provide communication with a plurality of output devices;
    a plurality of inputs configured to receive inputs from a plurality of output hosts;
    a memory coupled to the one or more processors and storing program instructions that when executed by the one or more processors cause the one or more processors to at least:
        receive output information from at least one of the plurality of output hosts;
        process at least a portion of an image included in the output information to obtain location information, wherein the location information is included in at least a portion of the image, the location information indicating at least one of:
            a physical location within a materials handling facility at which at least a portion of the output information is to be presented;
            a logical location within the materials handling facility at which at least a portion of the output information is to be presented; or
            a device identifier identifying an output device of the plurality of output devices to which to send at least a portion of the output information;
        determine, based at least in part on the location information, an output device from the plurality of output devices to which to send the output information; and
        send the output information to the output device.

6. The apparatus of claim 5, wherein the program instructions that when executed by the one or more processors further cause the one or more processors to access an output device map to determine an output device based on a mapping relationship between the location information and an output device identifier corresponding to an output device.

7. The apparatus of claim 5, wherein:
the location information is represented as at least one of a bitmap, a watermark or a color depth.

8. The apparatus of claim 5, wherein:
the output information is included in data received by the apparatus, and
the data includes a plurality of output information, wherein at least one of the plurality of output information is for a second output device.

9. The apparatus of claim 8, wherein the program instructions when executed further cause the one or more processors to at least:
process the data to determine respective output locations to receive each of the plurality of the output information.

10. The apparatus of claim 5, wherein the output information includes at least one of video data, audio data, or image data.

11. The apparatus of claim 5, wherein the location information is included in a portion of the image that is not visible when presented on the output device.

* * * * *